(12) United States Patent
Defoort et al.

(10) Patent No.: US 8,025,942 B2
(45) Date of Patent: Sep. 27, 2011

(54) RIGIDIFICATION OF STRUCTURES TO BE DEPLOYED BY INFLATING, PARTICULARLY FOR USE IN SPACE

(75) Inventors: Brigitte Defoort, Saint Medard En Jalles (FR); Xavier Coqueret, Phalempin (FR); Dominique Lacour, Tresses (FR)

(73) Assignee: Astrium SAS, Paris (FR)

( * ) Notice: Subject to any disclaimer, the term of this patent is extended or adjusted under 35 U.S.C. 154(b) by 1026 days.

(21) Appl. No.: 11/577,758

(22) PCT Filed: Oct. 20, 2005

(86) PCT No.: PCT/FR2005/050876
§ 371 (c)(1),
(2), (4) Date: Apr. 23, 2007

(87) PCT Pub. No.: WO2006/043009
PCT Pub. Date: Apr. 27, 2006

(65) Prior Publication Data
US 2009/0075091 A1 Mar. 19, 2009

(30) Foreign Application Priority Data
Oct. 22, 2004 (FR) ...................................... 04 52413

(51) Int. Cl.
*B32B 27/12* (2006.01)
*B32B 27/14* (2006.01)

(52) U.S. Cl. ..................... 428/35.7; 428/34.1; 428/34.2; 428/35.9; 428/36.9

(58) Field of Classification Search ................. 428/34.1, 428/34.2, 35.7, 35.9, 36.9
See application file for complete search history.

(56) References Cited

U.S. PATENT DOCUMENTS
4,801,495 A * 1/1989 van der Hoeven ............ 442/412
(Continued)

FOREIGN PATENT DOCUMENTS

| | | |
|---|---|---|
| AT | 384 025 B | 9/1987 |
| EP | 0 182 744 A2 | 5/1986 |
| JP | 7-316262 | 12/1995 |
| WO | WO 88/02879 | 4/1988 |

OTHER PUBLICATIONS

Edward J. Simburger, et al., "Developmnent, Design, and Testing of Powersphere Multifunctional Ultraviolet-Rigidizable Inflatable Structures", AIAA-2003-1897, XP-002323823, Sep. 2003, pp. 1-11.

(Continued)

*Primary Examiner* — Marc Patterson
(74) *Attorney, Agent, or Firm* — Oblon, Spivak, McClelland, Maier & Neustadt, L.L.P.

(57) ABSTRACT

The invention relates to the stiffening of inflatably deployable structures, in particular for space use.

More specifically, the invention relates to a flexible membrane for inflatably deployable structures, that comprises one layer of a composite and at least one polymer film that is permeable to visible radiation covering one of the faces of this layer, said composite being formed from a fibrous material impregnated with a composition incorporating an epoxide or epoxy/acrylate resin and a photoinitiator, and which is characterized in that the photoinitiator is an iron-arene complex salt of general formula (I):

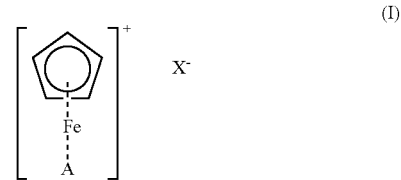

where A is an arene group, while X is a non-nucleophilic anion.

Applications: manufacture of devices of the following types: radars, solar panels, reflectors, solar shields, antennas, solar mirrors or sails, intended to equip orbital vehicles or vehicles for space or planetary exploration.

17 Claims, 3 Drawing Sheets

U.S. PATENT DOCUMENTS

| | | | | |
|---|---|---|---|---|
| 5,044,579 | A | | 9/1991 | Bernasconi et al. .......... 244/158 |
| 5,047,376 | A | | 9/1991 | Baumann et al. ................. 502/5 |
| 5,354,784 | A | * | 10/1994 | Timmons et al. ............... 522/33 |
| 5,660,644 | A | | 8/1997 | Clemens ....................... 136/245 |
| 2002/0099111 | A1 | * | 7/2002 | Nohr et al. ...................... 522/63 |
| 2004/0148901 | A1 | | 8/2004 | Cadogan et al. ................ 52/646 |

OTHER PUBLICATIONS

David P. Cadogan, et al., "Regidizable Materials for use in Gossamer Space Inflatable Structures", 42$^{nd}$ AIAA/ASME/ASCE/AHS/ASC Structures, Structural Dynamics, and Materials Conference & Exhibit AIAA Gossamer Spacecraft Forum, XP-002323822, Apr. 16, 2001, 1 front page, pp. 1-17.

Nesmeyanov, et al., Dokl. Akad, Nauk., SSSR 1965, 166, pp. 607-610.

Helene Degrand, et al., "Thermal effects on the network structure of diglycidylether of bisphenol-A polymerized by electron-beam in the presence of an iodonium salt", Radiation Physics and Chemistry, 2003, 68, Issue 5, pp. 885-891 (7).

* cited by examiner

RIGIDIFICATION OF STRUCTURES TO BE DEPLOYED BY INFLATING, PARTICULARLY FOR USE IN SPACE

TECHNICAL FIELD

The invention relates to stiffening of inflatably deployable structures, in particular for space use.

More specifically, the invention relates to a flexible membrane for inflatably deployable structures, to a method enabling this membrane to be stiffened, and also to uses of this membrane and of this method.

The invention especially finds an application in the manufacture of devices of the following types: radars, solar panels, reflectors, solar shields, antennas, solar mirrors or sails, intended to equip orbital vehicles such as satellites, telescopes or orbital stations, or vehicles for space or planetary exploration such as probes or robots.

PRIOR ART

The creation of compact and ultralight devices, capable of being inflatably deployed after being placed in orbit, has been envisaged since the beginning of the space age.

It has given rise to the filing of a certain number of patents, among which mention may be made, by way of example, of U.S. Pat. No. 5,044,579 [1] and No. 5,660,644 [2].

These devices comprise a set of generally tubular hollow structures, which are formed from thin membranes folded so as to form a seal and the deployment of which results in their filling with a pressurized gas such as nitrogen, which is stored in an adjoining reservoir. These structures are also known under the name of "gossamer structures".

One of the difficulties posed by the creation of gossamer structures is linked to the harshness of the space environment. Indeed, space is full of micrometeorites that are capable of piercing any airtight membrane and thereby of causing leaks and deflation that make the deployed structures lose their shape. It is therefore necessary to stiffen them after their deployment.

To date, three main types of stiffening technique have been proposed: mechanical techniques, physical techniques and chemical techniques.

The mechanical techniques consist in using the pressure of the filling gas to apply a metal foil, for example an aluminium foil, incorporating a higher stress in the structure than the deformation resistance of this metal so that, once the pressure is removed, the metal foil gives the structure shape and stiffness.

The physical techniques are, themselves, based on a phase transition (for example, cooling a material to a temperature below its glass transition temperature), on the use of shape-memory materials or else on the evaporation of a solvent or of a plasticizer present in the structure.

As for the chemical techniques, they aim to induce, by the temperature or ultraviolet radiation, the polymerization of a resin, this polymerization possibly being accelerated by catalysts carried by the filling gas.

Within the scope of an evaluation of these various techniques, based on the data from the literature, the inventors have come to the conclusion that the ultraviolet-induced polymerization of a resin could be one of the most advantageous ways of stiffening gossamer structures, as much as regards the reliability of this stiffening technique, the costs of the materials used and their implementation, and the mechanical properties of the stiffened structures (data not published).

Figure 1:
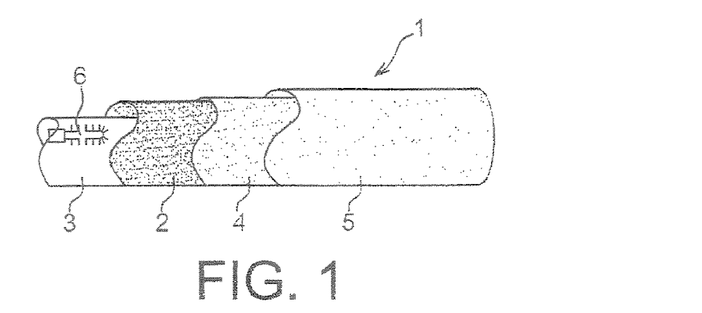
FIG. 1, already commented on, illustrates schematically the type of construction currently accepted for an inflatably deployable tubular structure, intended to be stiffened by ultraviolet-induced polymerization.

The appended FIG. 1 illustrates, in a schematic form, the type of currently accepted construction for a gossamer structure intended to be stiffened by ultraviolet-induced polymerization of a resin radiation. In this figure, only a portion of the structure has voluntarily been represented, and this in the deployed state, so as to make the components which form it visible.

This structure is in the form of a tube 1 of which the wail is formed by a flexible membrane that comprises one or more thicknesses of a fabric 2 pre impregnated with a composition based on a photopolymerizable resin, sandwiched between two thin polymer films, 3 and 4 respectively. These films have the role of ensuring the air-tightness necessary for inflating the structure and of preventing the thicknesses of impregnated fabric from adhering to each other when the membrane is folded in the structure before deployment, which would in fact prevent the deployment of the structure.

A multilayer thermal cover 5 optionally completes this sandwich.

The structure comprises, in addition, an ultraviolet lamp 6 which is placed inside the tube 1.

The composition based on a photopolymerizable resin must comprise, besides a reactive oligomer corresponding to the base molecule of the resin, at least one photoinitiator that is sensitive to ultraviolet radiation, that is to say a compound which decomposes when it is exposed to ultraviolet radiation in order to produce chemical species whose role is to initiate the polymerization of the resin.

In the case of a gossamer structure, the polymers forming the thin films 3 and 4 must meet specifications suitable for the space field. In particular, these films must be able to withstand extreme temperatures and have particularly high mechanical strength properties. Due to this fact, a limited number of polymers is capable of being used. In practice, these are aromatic polyimides, polyarylene ether benzimidazole and polybenzoxazole, the aromatic polyimides being currently preferred.

However, within the scope of their work, the inventors have noticed that these polymers strongly absorb light at wavelengths below 400 nm, so that their use is incompatible with stiffening a gossamer structure by polymerization of a resin induced by ultraviolet radiation (unpublished data).

The inventors have therefore set themselves the objective of providing a flexible membrane that is able to be incorporated into the formation of inflatably deployable structures, and to be stiffened in response to an irradiation other than by ultraviolet radiation.

The inventors have also set themselves the objective chat this polymerization may be initiated by a photoinitiator that does not need to be combined with a photosensitizer, and that the polymerization is of ionic rather than radical type, so that it is possible to independently control the initiation of the polymerization and the polymerization itself, and that the polymerization, once initiated, may continue in the absence of irradiation.

The inventors have, in addition, set themselves the objective that this polymerization may be initiated under similar conditions to those that prevail in a space environment (that is to say, under vacuum or under a very low gravity and at temperatures ranging from −150° C. to +200° C.), while using the lightest and smallest possible irradiation system, and with the same effectiveness whatever time has elapsed since the manufacture of the membrane, so that this membrane is perfectly suited to inflatably deployed structures for space use.

The inventors have further set themselves the objective that the polymerization of the resin accompanies a bleaching phenomenon of the photoinitiator after photolysis, so as to guarantee polymerization of the resin throughout the whole of the thickness that it occupies in the membrane and, consequently, an optimization of the mechanical properties of the membrane, once this polymerization is completed.

SUMMARY OF THE INVENTION

These objectives, and others too, are achieved by the invention, one subject of which is, in the first place, a flexible membrane for an inflatably deployable structure, which membrane comprises at least one layer of a composite and at least one polymer film that is permeable to visible radiation and that covers one of the faces of this layer, said composite being formed from a fibrous material impregnated with a composition incorporating an epoxide or epoxy/acrylate resin and a photoinitiator, and is characterized in that the photoinitiator is chosen from iron-arene complex salts of general formula (I) below:

(I)

in which A represents an arene group while X represents a non-nucleophilic anion.

The use of iron-arene complex salts to initiate the polymerization of an epoxide or epoxy/acrylate resin is not novel in itself. It has especially been proposed in the U.S. Pat. No. 5,047,376 [3] for producing coating, painting and adhesive materials, and also for encapsulating electronic components.

However, what is totally novel and unexpected is the fact that, on the one hand, these salts are capable of initiating the polymerization of an epoxide or epoxy/acrylate type resin in response to a visible radiation which is not applied directly to them but through a polymer film inserted between the composition in which they are located and the source emitting this visible radiation, and that, on the other hand, their use as photoinitiators is perfectly suitable for stiffening a membrane intended to be incorporated in the formation of a gossamer structure.

In the general formula (I) above, the arene group may be any aromatic monocyclic or polycyclic hydrocarbon-based group comprising from 6 to 32 carbon atoms, and preferably from 6 to 12 carbon atoms, in the aromatic ring, this hydrocarbon-based group which may bear one or more identical or different substituents, chosen from halogen atoms and linear or branched alkyl, alkoxyl, haloalkyl, nitroalkyl, cyanoalkyl and alkoxycarbonyl groups.

As examples of such an arene group, mention may be made of benzene, cumene, naphthalene, methylnaphthalene, phenanthrene, fluorene, coronene and ovalene.

The non-nucleophilic anion may itself be a halogen or chlorine anion of an element chosen from boron, phosphorus, arsenic, antimony, iron and bismuth such as, for example, $BF_4^-$, $PF_6^-$, $AsF_6^-$, $SbF_6^-$, $SbCl_6^-$, $FeCl_4^-$, $BiCl_6^-$ or else an anion of fluoroaliphatic or perfluoroaromatic sulphonic acid such as, for example, $CF_3SO_3^-$, $C_3F_7SO_3^-$, $C_4F_9SO_3^-$, $C_6F_{13}SO_3^-$ or else $C_6F_5SO_3^-$.

Among the iron-arene complex salts of general formula (I), cyclopentadienyl(1-methylnaphthalene)iron hexafluorophosphate is especially preferred, which corresponds to the particular formula (II) below:

(II)

this compound being in fact revealed to have particularly advantageous properties, in particular in terms of sensitivity to visible radiation, even when this is applied through a polymer film, and of heat stability.

The iron-arene complex salts of general formula (I) may especially be obtained, by substituting a cyclopentadienyl iron anion for the arene group, in the presence of an aluminium powder and aluminium chloride, as described by Nesmeyanov et al., Dokl. Akad. Nauk., SSSR 1965, 166, 607 [4].

In accordance with the invention, the photoinitiator represents, preferably, from 0.1% to 10% by weight of the weight of the resin, and better still from 0.2 to 5% by weight of the weight of the resin.

The fibrous material that is incorporated into the composition of the composite may be any material formed from conventionally used fibres like reinforcing fibres such as, for example, a material made from glass fibres, silica fibres, quartz fibres, carbon fibres, metal fibres such as steel fibres, aluminium fibres or boron fibres, organic fibres such as aramid fibres, polyethylene fibres, polyester fibres or polybenzoxazole (PBO) fibres, silicon carbide fibres, or else a material formed from a mixture of such fibres.

This fibrous material may be, dependent on the nature of the fibres that form it, in the form of chopped strands, milled fibres, continuous filament mats, chopped filament mats, rovings, fabrics, knits, felts, etc., or else in the form of complexes produced by combining various types of flat materials.

The fibrous material is, preferably, made from carbon fibres, glass fibres (for example, an E-glass taffeta, of 125 $g/m^2$, as sold by Porcher Industries under the reference 3365-1270-977C1) or a mixture of these fibres.

As for the resin that impregnates this fibrous material, it is, preferably, a resin derived from bisphenol A, and especially a bisphenol A diglycidyl ether resin (or BADGE resin) such as those sold by Dow Plastics under the references DER® 330 and DER® 332, or a multifunctional acrylic derivative of such a resin.

As a variant, this resin may also be chosen from cycloaliphatic epoxy resins, novolac epoxy resins and resins derived from mixtures of these resins together or mixtures of these resins with a BADGE resin.

In accordance with the invention, the polymer film that is permeable to visible radiation may form the inner face of the membrane, while the other face of the composite layer is covered with a thermal cover that forms the outer face of this membrane.

As a variant, the composite layer may be inserted between two polymer films that are permeable to visible radiation, and that are identical or different, in which case one of these polymer films forms the inner face of the membrane, while the other of these films is covered with a thermal cover which forms the outer face of this membrane.

In each case, the polymer film or films that are permeable to visible radiation are, preferably, one or some aromatic polyimide, polyarylene ether benzimidazole or polybenzoxazole films, the films made from aromatic polyimides such as those sold by DuPont under the trademark KAPTON® and by UBE Industries under the trademark UPILEX®, being particularly preferred. This or these polymer films have, for example, a thickness of 25 to 150 microns.

The thermal cover has the role of protecting the membrane against the extreme temperatures prevailing in a space environment and of maintaining its internal temperature within a relatively limited range, typically between −50 and +110° C.

Depending on the use for which the membrane is intended, this thermal cover may be more or less complex. Thus, it may especially be formed from a layer or a series of layers of a material having both radiation barrier properties and low infrared emissivity (MYLAR® polyester, KAPTON® aromatic polyimide, etc.), these layers possibly being coated on one or both their faces with a metal (aluminium, silver, gold, indium tin oxide, etc.) and be separated from one another by one or more layers of a material having a low thermal conductivity such as DACRON® net.

The flexible membrane according to the invention is noteworthy especially in that it is capable of being stiffened by a mechanism of cationically polymerizing the resin that it incorporates and in that this polymerization may be initiated by applying visible radiation and be activated by heat, this activation possibly being carried out at the same time as the initiation or at a later time. It is thus possible to control, if desired, the initiation of the polymerization of the resin independently from the polymerization itself.

Moreover, this polymerization extends throughout the whole thickness occupied by the resin in the membrane due to the fact that the iron-arene complex salts of formula (I) are bleached after photolysis.

Thus, another subject of the invention is a method for stiffening a flexible membrane as defined previously, this method being characterized in that it comprises:
a) irradiating the membrane with visible radiation through said at least one polymer film that is permeable to visible radiation in order to initiate the polymerization of the resin present in this membrane; and
b) heating the membrane to activate the polymerization of said resin,
and in that the heating of the membrane may be carried, out at the same time as or after its irradiation.

In accordance with the invention, the flexible membrane may be irradiated both with monochromatic and polychromatic radiation as long as the incident radiation lies in part of the absorption field of the initiator corresponding to wavelengths that are not filtered by the constituents of the membrane through which it passes.

In any case, the irradiation time is chosen as a function especially of the dimensions of the membrane that has to be stiffened and of the number and power of the radiation sources used, knowing that this time may range from several tens of minutes to several tens of hours, or even longer.

Similarly, the heating time may also range from several tens of minutes to several tens of hours or longer depending on the dimensions of the membrane to be stiffened, the heating system used and, especially, the heating temperature chosen, knowing that the membrane is, preferably, heated at a temperature at least equal to 50° C. but not exceeding 120° C.

According to one preferred embodiment of the method according to the invention, heating of the membrane is carried out after irradiating this membrane, in which case the membrane may either be heated immediately after the end of the irradiation or at a later time.

The flexible membrane according to the invention is particularly well-suited to being incorporated into the composition of inflatably deployed structures for space use, and especially of structures of the type of the one illustrated in the appended FIG. 1, except that the ultraviolet lamp 6 shown in this figure should be replaced by one or more sources emitting visible, monochromatic or polychromatic, radiation.

Thus, for example, insofar as, within the context of a space application, it is desirable to use radiation sources that are both very lightweight and of low power, the source or sources of visible radiation possibly being light-emitting diodes.

Heating of the flexible membrane could be, itself, provided either by a heater integrated within the structure and actuable on command, or by the temperature that may exist naturally within the structure when this structure is exposed to the sun, especially if it is a deployable structure making up part of an orbital device.

Therefore, a further subject of the invention is the use of a flexible membrane as defined previously in an inflatably deployable structure, and also the application of the method of stiffening this membrane as defined previously for stiffening an inflatably deployable structure.

The invention will be better understood in light of the remainder of the description that follows, which relates to examples that illustrate the physico-chemical characteristics of two iron-arene complex salts of formula (I) above and also the advantage of using these salts as photoinitiators in the stiffening of a gossamer structure by polymerization of an epoxy resin.

Of course, this remainder is given by way of illustrating the invention and does not constitute a limitation thereof in any manner.

DETAILED SUMMARY OF PARTICULAR EMBODIMENTS

The examples that follow have been carried out using two different iron-arene complex salts as photoinitiators, namely:
- on the one hand, cyclopentadienyl(cumene)iron hexafluorophosphate, hereinafter known as "photoinitiator 1" which corresponds to the general formula (I) in which A is a cumene group and X represents $PF_6$; and
- on the other hand, cyclopentadienyl (1-methylnaphthalene)iron hexafluorophosphate, hereinafter known as "photoinitiator 2" which corresponds to the particular formula (II).

Photoinitiator 1 was obtained from Ciba-Geigy (commercial reference: Irgacure 261), while photoinitiator 2 was synthesized by substituting a cyclopentadienyl anion of ferrocene by a 1-methylnaphthalene group in the presence of an aluminium powder and aluminium chloride according to the following procedure.

Prepared in a round-bottom flask, equipped with a side arm, a dropping funnel and a magnetic stirrer bar, is a mixture composed of 3.75 g of ferrocene (Aldrich product, reference F408), 0.75 g of an aluminium powder (Aldrich product, reference 21, 475-2) and aluminium chloride. The flask is purged three times with argon, then added to the mixture, with stirring, are 80 mL of 1-methylnaphthalene saturated with argon and 0.36 mL of water saturated with argon and everything is then refluxed for 2 hours under argon.

The resulting mixture is added to 150 ml of a mixture of ice and water, still with stirring. The largest amount possible of solid obtained is transferred into an Erlenmeyer flask, and is crushed with a glass rod and the resulting mixture is transferred into a separatory funnel. The aqueous phase is separated from the organic phase. 0.39 g of ascorbic acid is added to the aqueous phase in order to reduce the ferricinium [Fe(Cp)$_2$]$^+$ ions to ferrocene, then it is extracted with 3×75 mL of hexane in order to remove the ferrocene and it is filtered under vacuum to remove the residual aluminium.

A solution of 3 g of $NH_4PF_6$ in 15 mL of water is prepared, which is added to the filtrate with stirring, in order to obtain a precipitate corresponding to the crude salt. The stirring is maintained for 3 minutes. If the mother liquor remains strongly coloured, dark brown, $NH_4PF_6$ is readded and the stirring is maintained for a further 10 minutes, at the conclusion of which the crude salt is filtered under vacuum. The latter is purified by passing it, after having dissolved it in dichloromethane, through an alumina column surrounded by aluminium foil to limit the exposure to light. The volume of the eluted solution is reduced to 3 mL and the purified salt is precipitated with 10 mL of diethyl ether. After drying the precipitate under vacuum, the photoinitiator 2 is obtained in the form of an orange-red powder (yield: 30-50% depending on the batches synthesized).

EXAMPLE 1

Physico-chemical Characteristics of Photoinitiators 1 and 2 a) Chemical Formulae and Molecular Weights:
The crude chemical formulae and the molecular weights of photoinitiators 1 and 2 were the following:
- Photoinitiator 1: $C_{14}H_{17}FePF_6$, namely a molecular weight of 385.85; and
- Photoinitiator 2: $C_{16}H_{15}FePF_6$, namely a molecular weight of 407.85.

b) UV-visible Absorption Spectra:
The UV-visible absorption spectra of photoinitiators 1 and 2 were recorded from solutions of these compounds in three different solvents (dichloromethane, tetrahydrofuran and acetonitrile), using a SUPRASIL® quartz cuvette with an optical pathlength of 1 cm in a Varian Cary 50 Scan spectrometer.

For each solvent, three different photoinitiator concentrations (0.06% w/v, 0.1% w/v and 0.2% w/v) were tested.

Figure 2:
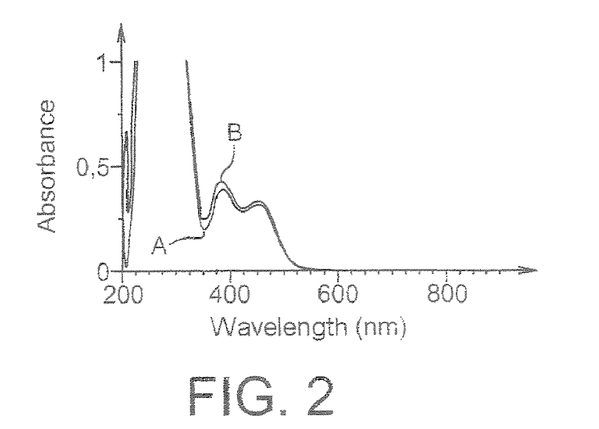
FIG. 2 represents the UV-visible absorption spectra of a first photoinitiator of general formula (I) at a concentration of 0.2% w/v in acetonitrile and in tetrahydrofuran (curve A), and also in dichloromethane (curve B).
Figure 3:
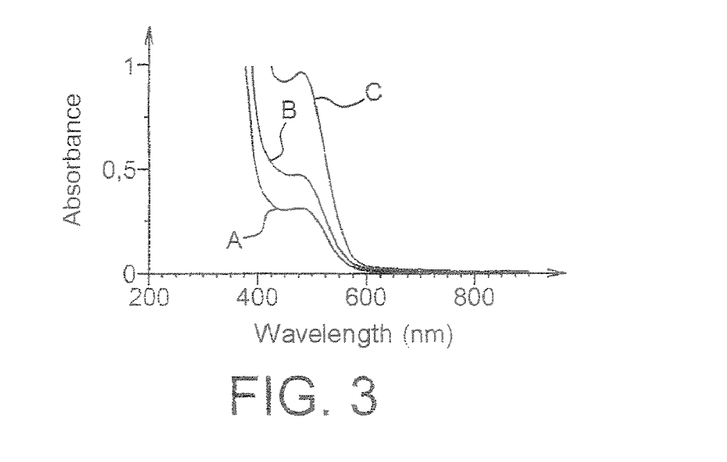
FIG. 3 represents the UV-visible absorption spectra of a second photoinitiator of general formula (I) at concentrations of 0.06% w/v (curve A), of 0.1% w/v (curve B) and of 0.2% w/v (curve C) in acetonitrile.

FIG. 2 shows the spectra as obtained for the photoinitiator 1 in solution at the same concentration (0.2% w/v) in the three solvents tested, curve A corresponding to the solutions in acetonitrile and in tetrahydrofuran, and curve B corresponding to the solution in dichloromethane, while FIG. 3 represents the spectra obtained for the photoinitiator 2 in solution in the same solvent (acetonitrile) at the three concentrations tested. In this figure, curve A corresponds to the concentration of 0.06% w/v, curve B corresponds to the concentration of 0.1% w/v and curve C corresponds to the concentration of 0.2% w/v.

FIG. 2 shows that the UV-visible absorption spectra of the photoinitiator 1 are almost identical in the three solvents tested. These spectra are characterized by the existence of two bands in the visible spectrum with two absorption maxima that are located at 388 nm and 455 nm respectively and an absorption that extends up to 550 nm.

FIG. 3 shows, itself, that as the UV-visible absorption spectra of the photoinitiator 2 differ from one photoinitiator concentration to another by the obtained absorbance values, these spectra show in any case a single absorption band in the visible range with an absorption maximum at 480 nm.

The absorption spectrum of the photoinitiator 2 is therefore offset towards the red relative to that of the photoinitiator 1.

The molar absorption coefficient of photoinitiator 1 at 455 nm ($\epsilon_{455}$ nm) in acetonitrile is 54 L.mol$^{-1}$.cm$^{-1}$, while that of photoinitiator 2 at 480 nm ($\epsilon_{480}$ nm) in this same solvent is 198 L.mol$^{-1}$.cm$^{-1}$.

EXAMPLE 2

Photolysis Under Visible Irradiation of Photoinitiators 1 and 2 in Epoxy Resins In the presence of epoxide functional groups, the photolysis of iron-arene complex salts is expressed by a substitution of the arene group of these salts by three epoxide molecules resulting in the formation of an active species that induces the cationic polymerization of the epoxide molecules.

The reaction scheme below illustrates this mechanism by taking the photoinitiator 1 as the example of an iron-arene complex salt.

-continued

The active species, which is no longer only linked to a single aromatic ring, namely the cyclopentadienyl group, no longer absorbs in the visible range.

This results in a bleaching phenomenon of the iron-arene complex salt after photolysis.

The photolysis under visible irradiation of photoinitiators 1 and 2 in the epoxy resins has been studied by subjecting thin films of an epoxy resin (DER® 332 resin from Dow Plastics), to which 2% w/w of one of these photoinitiators has been added, to visible irradiations of increasing duration and by following the change in the UV-visible absorption spectra of these films as a function of the duration of these irradiations.

The thin films of resin were produced by dissolving the photoinitiators 1 and 2 in the epoxy resin and by depositing an aliquot part of the solutions thus obtained between two glass lamellae having a thickness of 150 µm that were then joined together with a double-sided adhesive.

The visible irradiations were applied to the samples thus prepared by using a Lieselang overhead projector equipped with a 250 W Xenophot bulb. The samples were deposited either directly onto the glass top of the overhead projector, or onto a 50 µm thick aromatic polyimide (KAPTON® 100 HN by DuPont) film covering the glass top in order to assess the influence of this film on the photolysis of photoinitiators 1 and 2.

The UV-visible absorption spectra of the films were recorded using a Varian Cary 50 Scan spectrometer.

Figure 4:
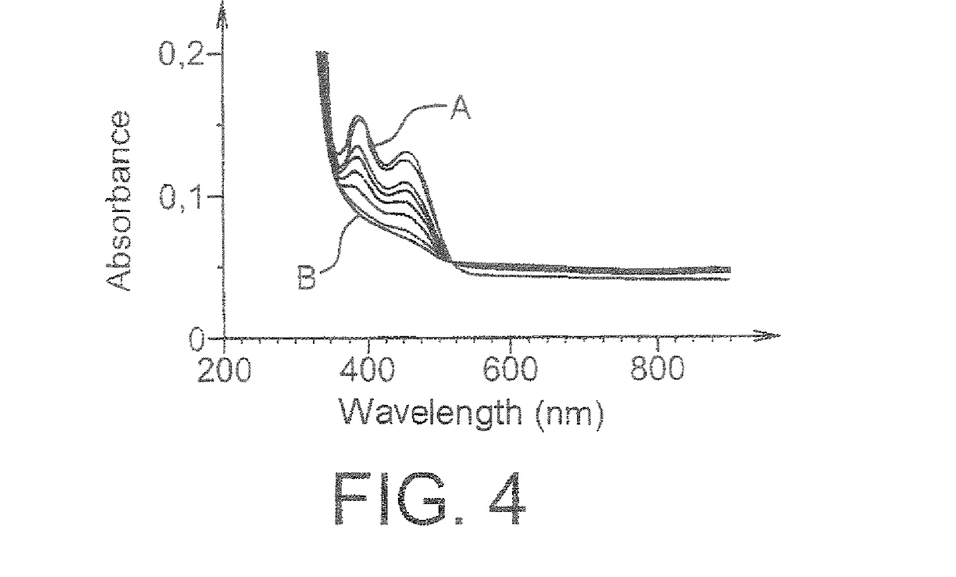
FIG. 4 illustrates the change in the UV-visible absorption spectrum of a thin film of an epoxy resin to which a first photoinitiator of formula (I) has been added at a concentration of 2% w/w when visible irradiations of increasing duration are applied to this film without insertion of a polymer film between this film and the source of visible radiation.
Figure 5:
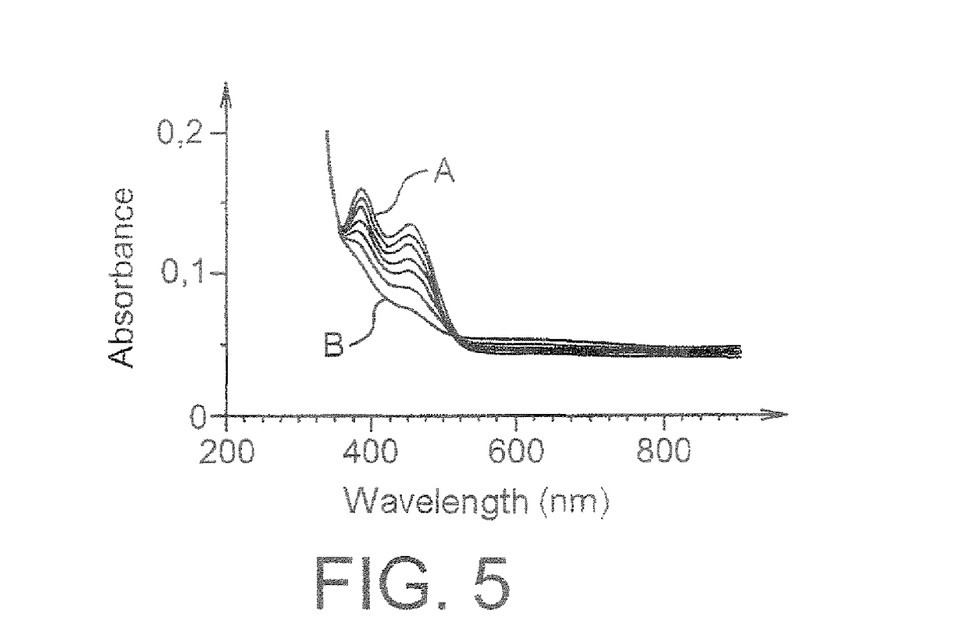
FIG. 5 illustrates the change in the UV-visible absorption spectrum of a thin film of an epoxy resin to which the first photoinitiator of formula (I) has been added at a concentration of 2% w/w when visible irradiations of increasing length are applied to this film through a polymer film.

FIGS. 4 and 5 illustrate the change in the UV-visible absorption spectra of two thin films of epoxy resin to which photoinitiator 1 had been added, FIG. 4 corresponding to the spectra obtained after irradiations without polyimide film and FIG. 5 corresponding to the spectra obtained after irradiation carried out through the polyimide film.

Figure 6:
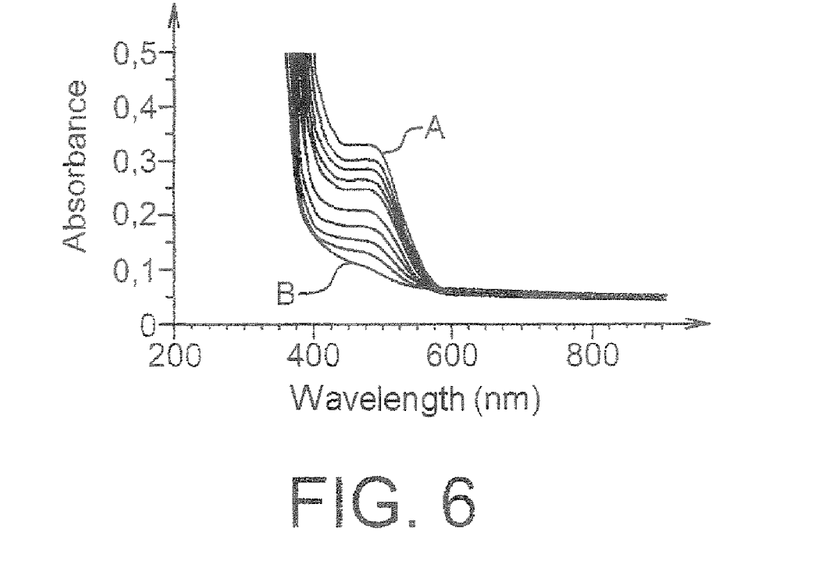
FIG. 6 illustrates the change in the UV-visible absorption spectrum of a thin film of an epoxy resin to which the second photoinitiator of formula (I) has been added at a concentration of 2% w/w when visible irradiations of increasing duration are applied to this film without insertion of a polymer film between this film and the source of visible radiation.
Figure 7:
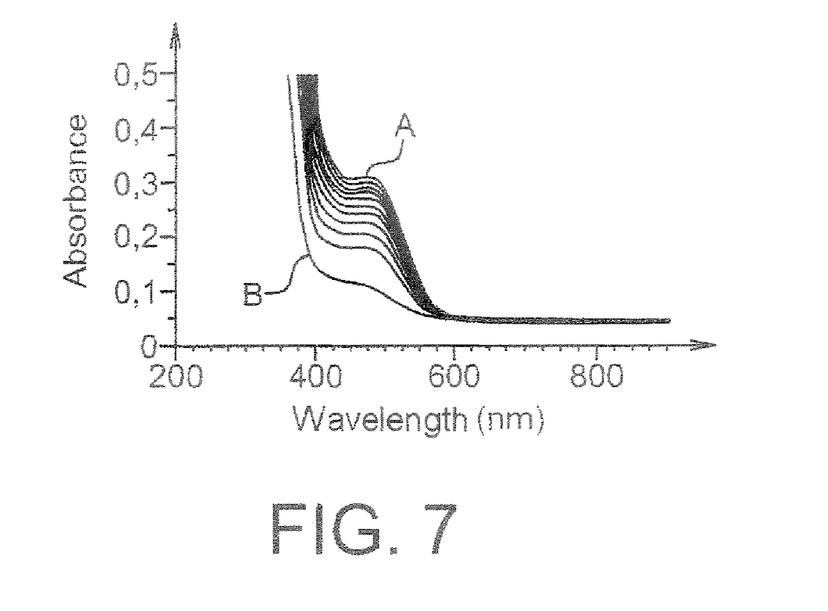
FIG. 7 illustrates the change in the UV-visible absorption spectrum of a thin film of an epoxy resin to which the second photoinitiator of formula (I) has been added at a concentration of 2% w/w when visible irradiations of increasing duration are applied to this film through a polymer film.

Similarly, FIGS. 6 and 7 illustrate the change in the UV-visible absorption spectra of two thin films of epoxy resin to which photoinitiator 2 had been added, FIG. 6 corresponding to the spectra obtained after irradiations without polyimide film and FIG. 7 corresponding to spectra obtained after irradiations carried out through the polyimide film.

In these Figures, the spectra having the highest absorbance values are those obtained before the films were subjected to an irradiation (curve A), while those having the lowest absorbance values are those obtained after the longest irradiation (curve B), namely an irradiation of 2640 seconds for FIG. 4, 5040 seconds for FIG. 5, 930 seconds for FIG. 6 and 1530 seconds for FIG. 7.

These Figures show that:
the photolysis of photoinitiators 1 and 2 indeed results in a decrease of their absorption in the visible range and therefore in a bleaching phenomenon of these photoinitiators;
an almost complete photolysis of photoinitiator 2 is obtained after less than 1000 seconds of direct irradiation whereas that of photoinitiator 1 requires a longer direct irradiation, of 2640 seconds;
the presence of an aromatic polyimide film between the resin films containing the photoinitiators 1 and 2 and the source emitting visible radiation lengthens the irradiation time needed to obtain the same degree of photolysis of these photoinitiators as that obtained in the absence of such a film; but
the presence of this film is less punishing in the case of photoinitiator 2 than in that of photoinitiator 1.

EXAMPLE 3

Induction and Activation of the Polymerization of Epoxy Resins Comprising Photoinitiator 2

The induction and activation of the polymerization of epoxy resins comprising the photoinitiator 2 were studied by the following two series of tests:
a first series consisting in subjecting thin films of an epoxy resin (DER® 330 from Dow Chemicals), to which 2% w/w of photoinitiator 2 had been added, to a visible irradiation of 15 or 30 minutes without insertion of an aromatic polyimide film between these films and the source of visible radiation, in then maintaining the films at 22° C., 50° C., 70° C., 90° C. or 110° C. for 10 or 40 minutes, and in determining the degree of conversion π of the epoxide functional groups of the resin at the end of the irradiation and at the end of the heat treatment respectively; and
a second series consisting in subjecting films of this same resin, to which 0.5%, 1%, 2% and 4% w/w of photoinitiator 2 had been added, to a visible irradiation of 30 minutes through an aromatic polyimide film, in then maintaining them at 70° C. for 10 or 40 minutes, and in determining the degree of conversion π of the epoxide functional groups of the resin at the end of the irradiation and at the end of the heat treatment respectively.

The thin films of resin were produced by dissolving the photoinitiator 2 in the resin and by depositing an aliquot part of the solutions obtained between two polyethylene films, each of 40 µm thickness, so as to isolate the resin from the ambient surroundings within a well-controlled geometry and without risk of contamination, nor inhibition, considering the inert and hydrophobic nature of the polyethylene.

The visible irradiations were applied to the samples thus obtained either at room temperature using a 250 W Xenophot bulb, or at a temperature of about 40° C. using a Linkam LTS350E thermally regulated plate. These two modes of irradiation are denoted in what follows as "OHP1" and "OHP2" respectively.

For irradiations through the aromatic polyimide film, a 50 µm thick KAPTON® 100 HN film was previously inserted between the source of visible radiation and the samples.

The conversion of the epoxide functional groups was assessed by Fourier transform infrared spectroscopy using a Perkin Elmer FTIR 2000 spectrometer and by using the infrared spectra obtained as described by Degrand et al., Radiation Physics and Chemistry, 2003, 68, issue 5, 885-891 (7) [5].

Tables 1 and 2 below present the degrees of conversion π obtained in the first and second series of tests respectively. In each of these tables, the overhead projector used and the length of the visible irradiation applied are indicated in the column "π after irradiation", between brackets.

TABLE 1

| T(° C.) of the heat treatment | π after irradiation | π after heat treatment for 10 min | π after heat treatment for 40 min |
|---|---|---|---|
| 22 | 0.13 (OHP1-30 min) | 0.08 | 0.08 |
| 50 | 0.22 (OHP2-15 min) | 0.32 | 0.44 |
| 70 | 0.28 (OHP2-30 min) | 0.41 | 0.50 |
| 90 | 0.26 (OHP2-30 min) | 0.52 | 0.58 |
| 110 | 0.13 (OHP1-30 min) | 0.60 | 0.67 |

TABLE 2

| Photoinitiator 2 concentration (% w/w) | π after irradiation | π after heat treatment for 10 min | π after heat treatment for 40 min |
|---|---|---|---|
| 0.5 | 0.13 (OHP1-30 min) | 0.25 | 0.29 |
| 1 | 0.17 (OHP1-30 min) | 0.43 | 0.47 |
| 2 | 0.11 (OHP1-30 min) | 0.45 | 0.52 |
| 4 | 0.10 (OHP1-30 min) | 0.37 | 0.56 |

These tables show that:
- visible radiation alone, which is known to induce photolysis of photoinitiators 1 and 2, in practice does not induce polymerization of the epoxy resin, and this being so whether or not a polyimide film is inserted between this resin and the source of visible radiation;
- on the other hand, heat has a beneficial effect on the conversion of the epoxide functional groups, this conversion surpassing 65% in the case of a heat treatment at 110° C. for 40 minutes;
- the length of exposure to the visible radiation influences not only the initial polymerization speed of the resin, but also the final level of this polymerization; thus, the temperature appears not to be the only factor controlling the conversion of epoxide functional groups when the degree of development of the photolysis is not taken to its maximum;
- the heat, when it is applied together with exposure to visible radiation, induces a start of the polymerization from the stage of photoinitiator photolysis;
- an increase of the photoinitiator concentration of the resin appears to have little influence on the degree of conversion of the epoxide functional groups in the case where the visible irradiation is applied without heat as well, but that, on the other hand, it significantly influences the speed and the final level of polymerization of the resin when the irradiation is followed by a heat treatment at 70° C.

REFERENCES CITED

[1] U.S. Pat. No. 5,044,579
[2] U.S. Pat. No. 5,660,644
[3] U.S. Pat. No. 5,047,376
[4] Nesmeyanov et al., Dokl, Akad, Nauk., SSSR 1965, 166, 607
[5] Degrand et al, Radiation Physics and Chemistry, 2003, 68, Issue 5, 885-891 (7).

The invention claimed is:

1. A structure which is inflatably deployable and stiffenable after being deployed, which comprises a flexible membrane, said membrane comprising at least one layer of a composite, said layer having a first face and a second opposite face, and at least one polymer film that is permeable to visible radiation and that covers the first face of the composite layer, said composite being formed from a fibrous material impregnated with a composition including a non-polymerized epoxide or epoxy/acrylate resin and a photoinitiator for initiating the polymerization of the resin upon irradiation of the membrane with a visible radiation and thereby obtaining the stiffening of the structure, wherein the photoinitiator is an iron-arene complex salt of formula (I):

in which A represents an arene group while X represents a non-nucleophilic anion.

2. The structure according to claim 1, wherein the photoinitiator is an iron-arene complex salt of formula (I) in which the arene group is an aromatic monocyclic or polycyclic group comprising from 6 to 32 carbon atomsin the aromatic ring optionally substituted by one or more groups; independently selected from the group consisting of a halogen atom, a linear alkyl, a branched alkyl, an alkoxyl group, a haloalkyl group, a nitroalkyl group, a cyanoalkyl group and an alkoxycarbonyl group.

3. The structure according to claim 2, wherein the photoinitiator is an iron-arene complex salt of formula (I) wherein the arene group is selected from the group consisting of benzene, cumene, naphthalene, methylnaphthalene, phenanthrene, fluorene, coronene and ovalene.

4. The structure according to claim 1, wherein the photoinitiator is an iron-arene complex salt of formula (I) wherein the non-nucleophilic anion is a halogen or chlorine anion of an element selected from the group consisting of boron, phosphorus, arsenic, antimony, iron and bismuth, or an anion of fluoroaliphatic or perfluoroaromatic sulphonic acid.

5. The structure according to claim 1, wherein the photoinitiator is cyclopentadienyl(1-methylnaphthalene)iron hexafluorophosphate.

6. The structure according to claim 1, wherein the photoinitiator represents from 0.1% to 10% by weight of the weight of the resin.

7. The structure according to claim 6, wherein the photoinitiator represents from 0.2 to 5% by weight of the weight of the resin.

8. The structure according to claim 1, wherein the fibrous material is a material formed from carbon fibres, glass fibres or a mixture of these fibres.

9. The structure according to claim 1, wherein the resin is a bisphenol A diglycidyl ether (BADGE) or a multifunctional acrylic derivative of such a resin.

10. The structure according to claim 1, wherein said membrane has an inner face and an outer opposite face and wherein the polymer film that is permeable to visible radiation forms the inner face of the membrane, while the second face of the composite layer is covered with a thermal cover that forms the outer face of the membrane.

11. The structure according to claim 1, wherein the composite layer is inserted between a first polymer film and a second polymer film that are permeable to visible radiation, and that are identical or different.

12. The structure according to claim 11, wherein said membrane has an inner face and an outer opposite face and wherein the first polymer film forms the inner face of the membrane, while the second polymer film is covered with a thermal cover which forms the outer face of the membrane.

13. The structure according to claim 1, wherein the polymer film that is permeable to visible radiation is an aromatic polyimide film, a polyarylene ether benzimidazole film or a polybenzoxazole film.

14. The structure according to claim 13, wherein the polymer film that is permeable to visible radiation is an aromatic polyimide film.

15. A method for stiffening a structure as defined in claim 1, comprising:
   a) irradiating the structure with visible radiation through said at least one polymer film that is permeable to visible radiation in order to initiate the polymerization of the resin present in this structure; and
   b) heating the structure to activate the polymerization of said resin, wherein the heating of the structure may be carried out at the same time as or after its irradiation.

16. The method according to claim 15, wherein the heating of the membrane is carried out after its irradiation.

17. The structure according to claim 2, wherein said arene group is an aromatic monocyclic or polycyclic group comprising from 6 to 12 carbon atoms in the aromatic ring and is optionally substituted.

* * * * *